(12) United States Patent
Li et al.

(10) Patent No.: US 9,910,184 B2
(45) Date of Patent: Mar. 6, 2018

(54) ALIGNMENT SYSTEM AND METHOD FOR CONTAINER OR VEHICLE INSPECTION SYSTEM

(71) Applicants: Tsinghua University, Haidian District, Beijing (CN); Nuctech Company Limited, Haidian District, Beijing (CN)

(72) Inventors: Jianmin Li, Beijing (CN); Yulan Li, Beijing (CN); Yuanjing Li, Beijing (CN); Hao Yu, Beijing (CN); Chunguang Zong, Beijing (CN); Jingyu Gu, Beijing (CN); Weifeng Yu, Beijing (CN); Quanwei Song, Beijing (CN); Weizhen Wang, Beijing (CN); Shangmin Sun, Beijing (CN); Yinong Liu, Beijing (CN); Junli Li, Beijing (CN); Chuanxiang Tang, Beijing (CN)

(73) Assignees: Tsinghua University, Haidian District, Beijing (CN); Nuctech Company Limited, Haidian District, Beijing (CN)

( * ) Notice: Subject to any disclaimer, the term of this patent is extended or adjusted under 35 U.S.C. 154(b) by 99 days.

(21) Appl. No.: 14/965,978

(22) Filed: Dec. 11, 2015

(65) Prior Publication Data
US 2016/0170074 A1 Jun. 16, 2016

(30) Foreign Application Priority Data
Dec. 11, 2014 (CN) .......................... 2014 1 0767544

(51) Int. Cl.
  *G01V 5/00* (2006.01)
  *G01N 23/04* (2006.01)
  *G21K 1/02* (2006.01)

(52) U.S. Cl.
  CPC .......... *G01V 5/0016* (2013.01); *G01V 5/0008* (2013.01); *G21K 1/02* (2013.01)

(58) Field of Classification Search
  CPC ........... A61B 6/587; A61B 6/08; A61B 6/547; A61B 6/4405; A61B 6/4441;
  (Continued)

(56) References Cited

U.S. PATENT DOCUMENTS 9,223,049 B2 * 12/2015 Kotowski .............. G01N 23/04
2008/0298546 A1   12/2008 Smith
(Continued)

FOREIGN PATENT DOCUMENTS

CN    1133440 A    10/1996
CN    2890902 Y    4/2007
(Continued)

OTHER PUBLICATIONS

Extended European Search Report for corresponding European Patent Application No. 15199611.3 dated Apr. 26, 2016, 8 pgs.
(Continued)

*Primary Examiner* — Don Wong
(74) *Attorney, Agent, or Firm* — Merchant & Gould P.C.

(57) ABSTRACT

The present disclosure discloses an alignment system and an alignment method for a container or vehicle inspection system, and an inspection system. The inspection system comprises comprising an ray source, a collimator, a detector arm and a detector module mounted on a detector arm, the ray source, the collimator and the detector module are arranged to form an inspection passage, a ray beam emitted from the ray source passes through collimator and irradiates onto an inspected object, and an attenuated ray beam is collected by the detector module so as to complete inspection. The alignment system comprises a measuring module arranged to receive the ray beam emitted from the collimator and to measure the ray beam so as to determine positions and orientations of the ray source and the collimator. With the alignment method, alignment between a center point of the ray source, a central line of a detector tip and a central line of the collimator may be more accurately measured.

11 Claims, 5 Drawing Sheets

(58) Field of Classification Search
CPC .. G01V 5/0008; G01V 5/0016; G01V 5/0066; G01N 2223/639
USPC .................................. 378/4, 205, 57, 62, 63
See application file for complete search history.

(56) References Cited

U.S. PATENT DOCUMENTS

| | | |
|---|---|---|
| 2009/0086907 A1 | 4/2009 | Smith |
| 2011/0274242 A1 | 11/2011 | Linev |
| 2014/0192958 A1 | 7/2014 | Dinca et al. |
| 2014/0321588 A1 | 10/2014 | Gonzani et al. |

FOREIGN PATENT DOCUMENTS

| | | |
|---|---|---|
| CN | 1963476 A | 5/2007 |
| CN | 200993644 Y | 12/2007 |
| CN | 101813642 A | 8/2010 |
| CN | 102023306 A | 4/2011 |
| CN | 102834738 A | 12/2012 |
| CN | 103185891 A | 7/2013 |
| CN | 104634796 A | 5/2015 |
| CN | 204314235 A | 5/2015 |
| EP | 1 447 659 A2 | 8/2004 |

OTHER PUBLICATIONS

International Search Report and Written Opinion of the International Searching Authority for corresponding International Patent Application No. PCT/CN2015/096537 dated Mar. 7, 2016, 10 pgs, English translation of form PCT/ISA/210.
First Chinese Office Action for corresponding Chinese Patent Application No. 201410767544.0 dated Sep. 26, 2016, 8 pages.
Second Chinese Office Action for corresponding Chinese Patent Application No. 201440767544.0 dated Mar. 30, 2017, 8 pages.
Nuclear Electronics & Detection Technology, 27(2): 293-295 (2007).

\* cited by examiner

ALIGNMENT SYSTEM AND METHOD FOR CONTAINER OR VEHICLE INSPECTION SYSTEM

This application claims benefit of Serial No. 201410767544.0, filed 11 Dec. 2014 in China and which application is incorporated herein by reference. A claim of priority is made to the above disclosed application.

BACKGROUND OF THE INVENTION

Field of the Invention

Embodiments of the present disclosure relate to the field of X or Gamma ray security inspection, and particularly, to an X or Gamma ray inspection system for inspecting an object such as a container or vehicle, and an alignment system and an alignment method for the inspection system.

Description of the Related Art

Term "three points on one line" relates to a target spot of an accelerator, a central line of a detector tip, a central line of a collimator which are coplanar, and adjustments of "three points on one line" are intended to ensure that the target spot of the accelerator, the central line of the detector tip, and the central line of the collimator (sometimes including a central line of a calibrating device and the like) are located in one reference plane, as shown in FIG. 1.

In an existing measurement method, alignment of the target spot of the accelerator, the central line of the detector tip, and the central line of the collimator is manually measured by using a laser theodolite. A vertical line of a reticle of the theodolite is arranged to coincide with central lines of detectors on upper and lower ends of a detector vertical arm, and to align with a center of the target spot as far as possible. This method is implemented through the human eye, and thus is insufficient in objectivity and accuracy, that is, is easily and greatly affected by placement and debugging of instruments and the visual sense of the measurer.

Further, a detector arm mount is generally used in many existing movable inspection systems, and needs to be unfolded quickly for operation after these movable inspection systems reach a new inspection site. However, the detector arm or mount, as a mechanical structure, needs to be further adjusted so that the ray source, the collimator and the detector are located within one plane. Thus, there is a need to alignment system and method enabling accurate, quick and reliable alignment.

SUMMARY OF THE INVENTION

In view of the above, an object of the present disclosure is aimed to solve at least one of the above problems so as to achieve quick alignment of the ray beam and the detector module of the inspection system.

According to a first aspect of the present disclosure, there is provided an alignment system for a container or vehicle inspection system, comprising a measuring module, which is a sensor array consisted of a plurality of sensors each configured to measure ray intensity; a row of sensors of the measuring module are arranged on a longitudinal central line of a detector module of the container or vehicle inspection system, so that it is determined that rays are aligned with the detector module when a ray intensity value measured by the row of sensors of the measuring module arranged on the longitudinal central line of the detector module ray intensity value is a maximum value of a ray intensity value curve.

According to a second aspect of the present disclosure, there is provided an alignment system for a container or vehicle inspection system, comprising a measuring module, which is a sensor row consisted of a plurality of sensors each configured to measure ray intensity; one sensor of the measuring module is arranged on a longitudinal central line of a detector module of the container or vehicle inspection system, so that it is determined that rays are aligned with the detector module when a ray intensity value measured by the one sensor of the measuring module arranged on the longitudinal central line of the detector module is a maximum value of a ray intensity value curve.

According to a third aspect of the present disclosure, there is provided an inspection system for a container or a vehicle, comprising an ray source, a collimator, a detector arm and a detector module mounted on the detector arm, the ray source, the collimator and the detector module being arranged to form an inspection passage, rays emitted from the ray source passing through collimator, irradiating onto an inspected object and collected by the detector module so as to complete inspection, wherein the inspection system further comprises the above alignment system.

According to a fourth aspect of the present disclosure, there is provided an alignment method for an inspection system for a container or a vehicle, comprising: arranging the above alignment system on a longitudinal central line of the detector module located on a detector arm of the container or vehicle inspection system; arranging a ray source, a collimator and the detector module of the container or vehicle inspection system to form an inspection passage, the ray source emitting rays, which pass through the collimator and are received by the measuring module of the alignment system and the detector module; determining a position of a main ray beam based on ray intensity maximum values fed back from respective sensors of the measuring module; calculating a difference between a position on the detector module to which the main ray beam irradiates and the position of the longitudinal central line of the detector module; and adjusting the position of the ray source, the collimator or the detector module so that position on the detector module to which the main ray beam irradiates coincides with the position of the longitudinal central line of the detector module.

DETAILED DESCRIPTION OF PREFERRED EMBODIMENTS OF THE INVENTION

Exemplary embodiments of the present invention will be described hereinafter in detail with reference to the attached drawings, wherein the like reference numbers refer to the like elements. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
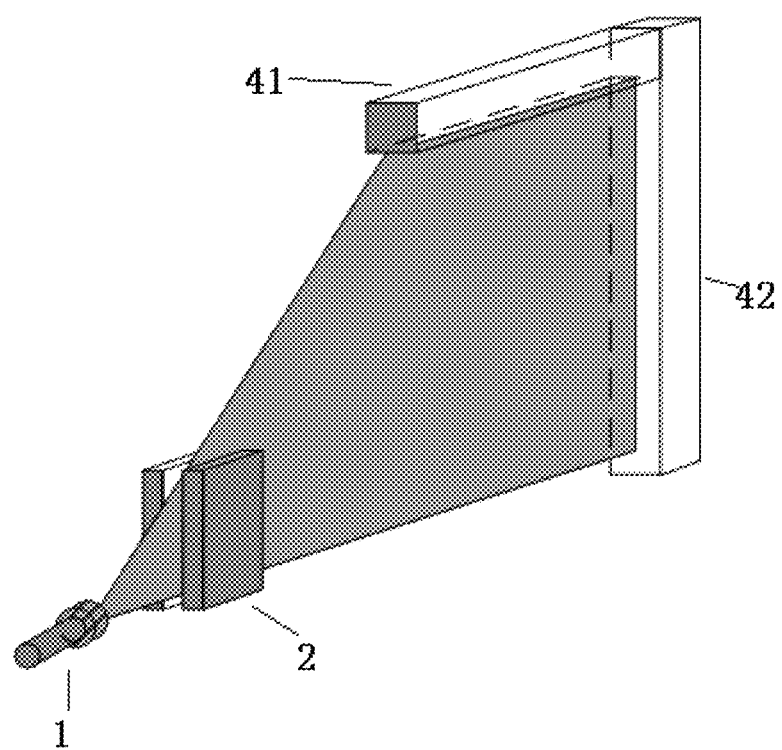
FIG. 1 is a schematic diagram showing a plane where a ray source, a collimator and detectors of a detector module arranged on a detector arm are desired to be located.
Figure 2:
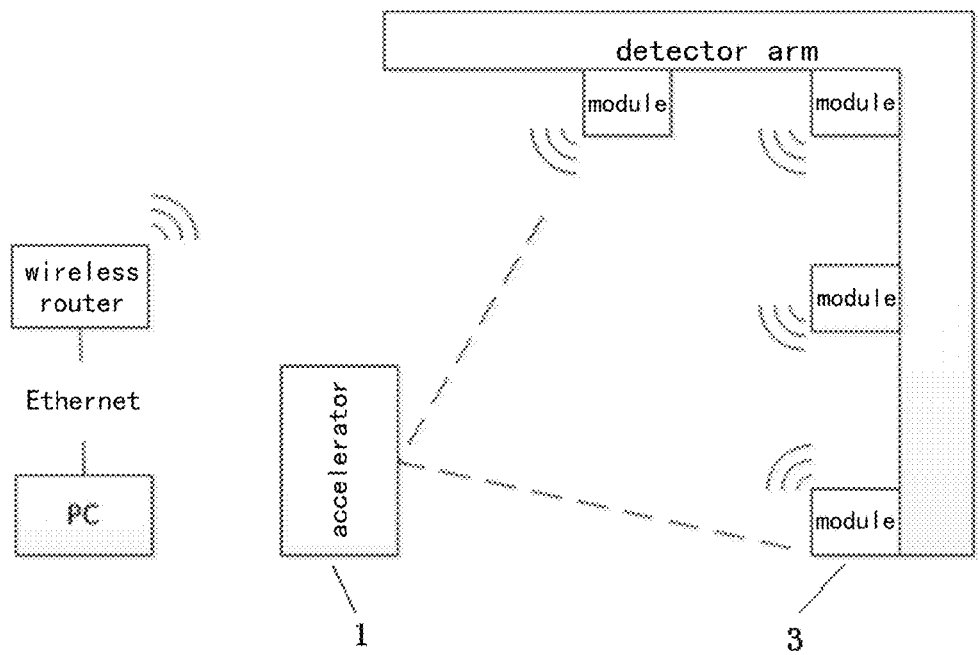
FIG. 2 is another schematic diagram showing a ray source, a collimator and detectors of a detector module arranged on a detector arm.

In an embodiment of the present disclosure, a container or vehicle inspection system, in which X or Gamma rays are applied, comprises a ray source 1, a collimator 2 and a detector module 3 mounted on a detector arm. The ray source 1 may be an X-ray accelerator or a Gamma ray accelerator. In order to obtain better collimated rays, the collimator 2 may be arranged at a ray outlet of the accelerator. Those skilled in the art will understand that desired rays may be obtained by using other devices, for example, a device for directly emitting collimated rays. The detector module 3 is provided on the detector arm 4. The detector arm 4 comprises a detector transverse arm 41 and a detector vertical arm 42, and when the detector arm 4 is unfolded, the detectors 3 on the detector transverse arm 41 and the detector vertical arm 42 receive a ray beam collimated by the collimator 2 and transmitted through an inspected object, thereby achieving inspection. That is, in use, the ray source 1, the collimator 2 and the detector module 3 forms an inspection passage, as shown in FIG. 2.

The container or vehicle inspection system, in which X or Gamma rays are applied, further comprises an alignment system configured to align the ray source 1, the collimator 2 and the detector module 3.

The alignment system comprises a measuring module 5. The measuring module 5 is arranged on the detector module 3. In one embodiment, the measuring module 5 is arranged on the arm or mount 4 of the detector module 3. The measuring module 5 is arranged to receive rays emitted from the ray source 1. As shown in FIG. 3, the measuring module 5 extends in a transverse direction, and the detector module 3 extends in a longitudinal direction.

In an embodiment of the present disclosure, in order to determine the position of the detector module 3, the measuring module 5 is located at the position of the detector module 3 of the inspection system, so that the orientation of the collimator 2, that is, the position of a point of fall of the ray, is measured by the measuring module 5, and according to the measurement, the collimator 2 is adjusted to face towards the detector module 3. In this embodiment, the measuring module 5 is arranged on the detector arm 4 provided with the detector module 3, and it is ensured that a central line of the detector module 3 in a transverse direction or a central line of the detector arm 4 in the transverse direction corresponds to a certain known portion of the measuring module 5, for example, to a middle point of the measuring module 5. Herein, the central line of the detector module 3 is the same as the central line of the detector arm or mount 4, that is, the detectors are arranged in a vertical direction, and the detector arm 4 is divided into two equal halves by the central line extending in the vertical direction.

Figure 3A:
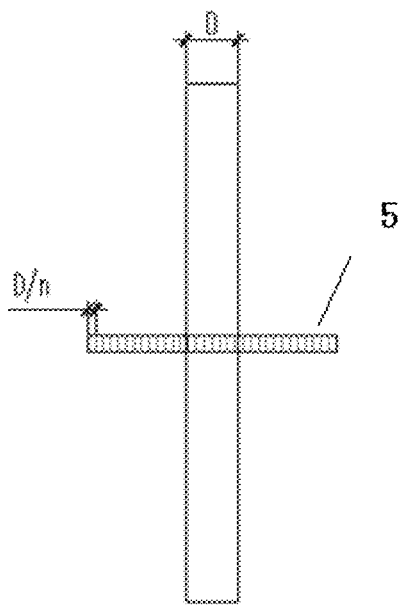
FIG. 3a is a schematic diagram showing a measuring module according to an embodiment of the present disclosure, the measuring module being transversely arranged on a detector module.
Figure 4:
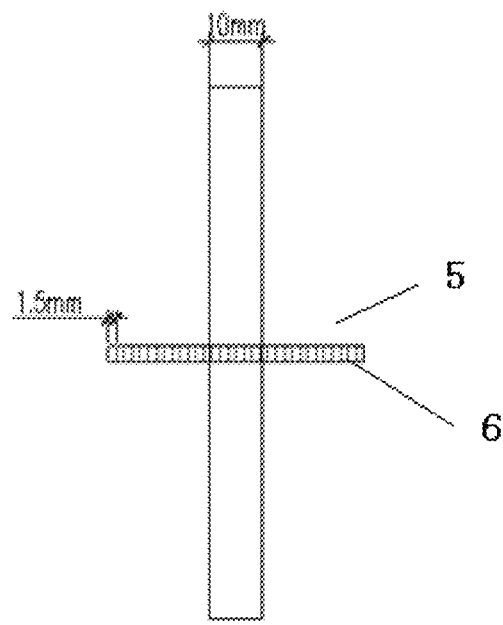
FIG. 4 is a schematic diagram showing a particular size of a measuring module according to an embodiment of the present disclosure.

In an embodiment of the present disclosure, the measuring module 5 is provided on the detector arm 4, as shown in FIG. 2. The measuring module 5 is consisted of a plurality of detector crystals 6, which have sizes smaller than those of detector crystals 6 of the imaging detector module 3 of the inspection system, or are small-sized detectors when compared to the detector crystals 6 of the imaging detector module 3 of the inspection system. Preferably, as shown in FIG. 3a, the width of each small-sized detector crystal 6 of the measuring module 5 may be 1/n of the measuring module 5, where n is an integer and may be selected as required. In other words, the measuring module 5 may be consisted of several small-sized detector crystals 6, which are arranged side by side to form a slender or elongate block body 6. The total width of the measuring module 5 is larger than the width of the detector module 3 of the system, as shown in FIG. 4. The length direction of the measuring module 5 extends in the transverse direction of the detector module 3.

The measuring module 5 may be mechanically positioned on the detector module 3, and the elongate measuring module 5 may be arranged such that its middle point is located on the central line of the detector arm 4. The length extending direction of the elongate measuring module 5 is perpendicular to the length extending direction of the detector arm 4. As such, a specific position of a center of a beam may be finely and quantificationally measured.

Data measured by each measuring module 5 may be transmitted to a computer for analysis.

In an embodiment of the present disclosure, the total width of the measuring module 5 is four to five times of the width of the detector module 3 of the system. For example, the width of the detector module 3 is 10 mm, the width of each small-sized detector crystal 6 of the measuring module 5 is 1.5 mm, and the measuring module 5 is consisted of thirty two small-sized detector crystals 6 and thus its width is 32×1.5=48 mm, as shown in FIG. 4.

Figure 5:
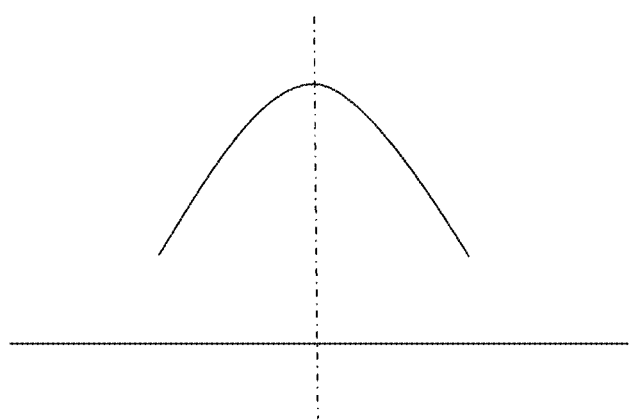
FIG. 5 is a schematic diagram showing a ray intensity distribution measured by a measuring module when a collimator is positioned to align with a central line of a detector module.

When the ray source 1 emits rays, a ray beam irradiates the measuring module 5 after being collimated by the collimator 2, the collimated rays are incident onto the plurality of detector crystals 6 of the measuring module 5, where a ray intensity received by a detector crystal 6 onto which the rays are being incident is the greatest, and energy of rays received by the detector crystals 6 adjacent to the detector crystal 6 onto which the rays are being incident is gradually reduced, that is, the ray intensities measured by the detector crystals 6 reduce as distances at which they are located away from the detector crystal 6 onto which the rays are being incident increase. FIG. 5 is a schematic diagram showing a curve formed by intensity values respectively measured by the thirty two detector crystals 6 when the center of the measuring module 5 is located on the central line of the detector arm 4.

As can be seen from FIG. 5, since the collimated rays are aligned with the central line of the detector arm 4, the ray intensity detected by the detector crystal 6 at the middle of the measuring module 5 is the strongest, that is, the highest point in the curve of the figure (the Y axis in the Figure shows normalized values of the measured ray intensities). Ray intensities measured by the detector crystals 6 located away from the middle point of the measuring module 5 reduce as distances between these detector crystals 6 and the middle point. According to embodiments of the present disclosure, it is advantageous to determine alignment by using the curve shown in FIG. 5, for example, the operator may directly determine the position of a peak of the rays according to positions on the curve and thus directly determine a direction to which an adjustment is to be made.

When the collimator 2 is not aligned with the middle point of the measuring module 5, that is, not aligned with the central line of the detector arm 4, the highest point on the curve shown in FIG. 5 will deviate from the middle point of the measuring module 5 (because the detector crystals 6 are fixed in position, the position of the middle detector crystal 6 is known, and measured ray intensity value fall on the Y axis).

Figure 6:
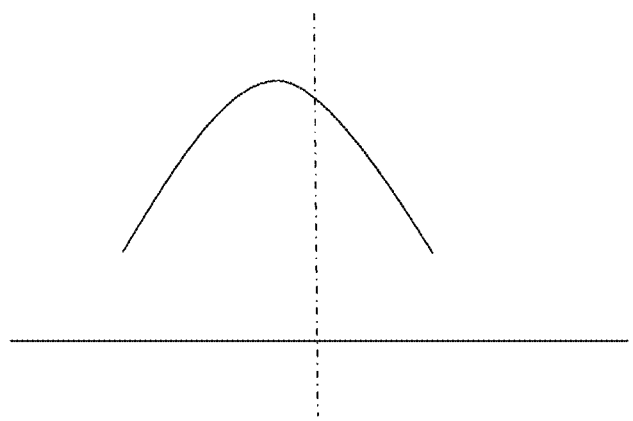
FIGS. 6 and 7 are schematic diagrams showing ray intensity distributions measured by a measuring module when a collimator is positioned to deviate from a central line of a detector module.
Figure 7:
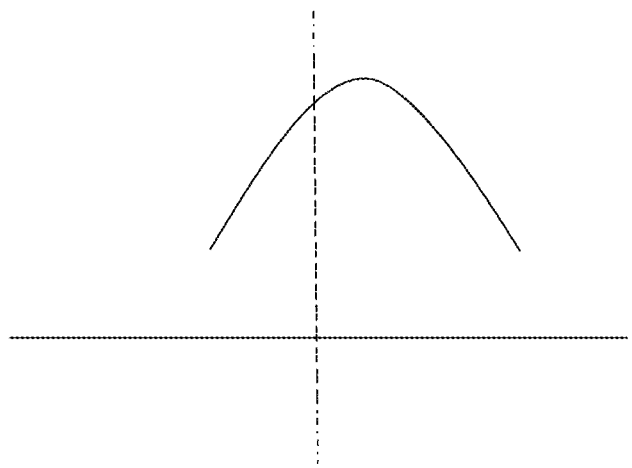

FIG. 6 and FIG. 7 are schematic diagrams respectively showing intensity curves measured when the collimator 2 deviates from the central line of the detector arm 4. In the present disclosure, deviation of the peak on the intensity curve from the Y axis may be used to indicate deviation of the collimator 2 or X-ray (or misalignment of the detector module; it will be understood by those skilled in the art that the misalignment is relative, that is, relates to relative positions between the combination of the X-rays and the collimator on an emitting side and the detector module on a receiving side), and the intensity peak can be adjusted onto the Y axis by adjusting the direction of the collimator 2 to face or align with the central line of the detector arm 4. With such a curve analogous to a parabola, the operator can directly judge the deviation and approximately estimate deviation amount through the deviation of the peak of the curve from the Y axis, thereby the alignment operation is easy.

Thus, with the technique solutions provided according to embodiments of the present disclosure, uncertainty and randomicity of manual operations and adverse effects on subsequent inspection due to the randomicity can be avoided, and the alignment method is simple and explicit, adjustment is direct and quick, so that it is convenient for the operator to quickly complete preparation work before inspection. When the operator observes that the peak of the curve is on the right side of the Y axis, the detector module may be adjusted rightward. If the mount on which the detector module is provided is fixed, the X-rays and collimator are adjusted so that the ray beam or ray beams move leftward. In practice operation, the operator observes the curve to make a direct judgement without trying to find out adjustment direction, so that the preparation work before inspection is easy and quick.

An adjustment device may be provided to adjust the orientation of the collimator 2. For example, a motor and a pivoting device may be provided, and the motor drives the pivoting device to pivot the collimator 2 so as to adjust the orientation of the collimator 2. Thus, automated adjustment may be achieved.

According to an embodiment of the present disclosure, a method of aligning an accelerator and a detector by using an X or Gamma ray container or vehicle inspection system comprises steps of: 1) emitting rays by the accelerator; 2) measuring an ray intensity distribution by using the measuring module 5; 3) determining relative positions of the ray source 1, the collimator 2 and the arm 4, and making an adjustment; 4) repeating the steps 2, 3, until the ray beam collimated by the collimator 2 is aligned with the detector module 3.

Specifically, for example, when a curve shown in FIG. 6 is displayed, the operator may adjust the collimator 2 rightward so that the intensity peak of the curve shown in FIG. 6 is moved to the Y axis. When a curve shown in FIG. 9 is displayed, the operator may adjust the collimator 2 leftward so that the intensity peak of the curve shown in FIG. 6 is moved to the Y axis.

When the target spot of the accelerator, the central line of the detector tip and the central line of the collimator 2 are completely aligned with each other, signal intensities of X or Gamma rays received by respective detector crystals 6 of each measuring module 5 would be those shown in FIG. 5, in order words, the center of the ray beam may impinge the middlemost portion of the measuring module 5, that is, the tip central line of each detector module 3.

According to the ray intensity distribution measured by respective detector modules 3 on the arm or mount 4, relative position relationship between the ray source 1, the collimator 2 and the arm or mount 4 may be determined, and position offset and angle deflection may be calculated to correct the system, so that the intensity distribution measured by all detector modules 3 is a parabola-like curve, as shown in FIG. 5.

In another embodiment according to the present disclosure, a certain detector crystal 6 of the measuring module 5 is located on the central line of the detector module 3. Since it is known that the detector crystal 6 is located on the central line, it only needs to adjust the orientation of the collimator 2 so that the detected ray intensity maximum value is positioned at the position of the known detector crystal 6, thereby it can be determined that the collimator 2 is aligned with the central line of the detector module 3. That is, in this embodiment, the center of the measuring module 5 is not located on the central line of the detector module 3.

In a further embodiment according to the present disclosure, the measuring module 5 is integrated into a whole. The measuring module 5 is an elongate measuring module 5, which may be an array consisted of a set of sensors each located at a defined and known position. Thus, the intensity of the ray beam received by each sensor is known. That is, the intensity of the ray beam received by each position is known. Accordingly, the orientation of the collimator 2 may be determined by viewing the position of the peak in the ray beam intensities. Similar to the above embodiments, the orientation of the collimator 2 may be adjusted so that the ray beam emitted from the collimator 2 faces toward a desired position, for example, toward the central line of the detector module 3.

Figure 3B:
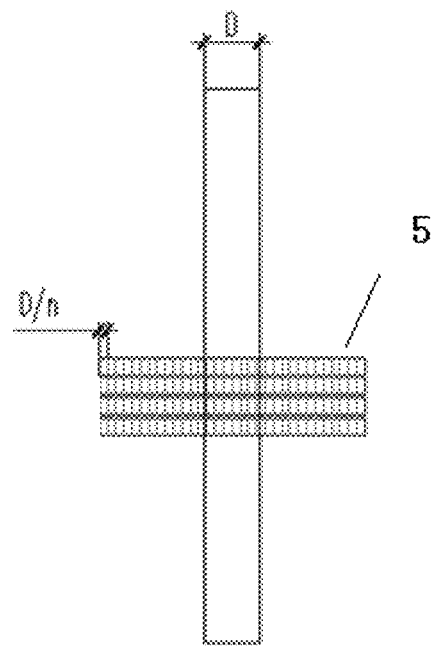
FIG. 3b is a schematic diagram showing a measuring module according to an embodiment of the present disclosure, the measuring module being transversely arranged on a detector module.

In a further embodiment according to the present disclosure, as shown in FIG. 3b, an alignment system for a container or vehicle inspection system comprises a measuring module 5, which is a sensor array consisted of a plurality of sensors each configured to measure ray intensity. A row of sensors of the measuring module are arranged on a longitudinal central line of a detector module of the container or vehicle inspection system. It is determined that rays are aligned with the detector module when a ray intensity value measured by the row of sensors (or a number of rows of small-sized sensors if the small-sized sensor of the measuring module has a volume much smaller than that of the detector module) of the measuring module arranged on the longitudinal central line of the detector module ray intensity value is a maximum value of a ray intensity value curve.

It is known for those skilled in the art that the detector crystal 6 may has a certain volume, and the measuring module 5 is substantially transversely arranged along the detector arm 4, thus the technique solutions of the present disclosure are possible when an angle between the measuring module 5 and the detector arm 4 is in a certain range around 90 degrees.

According to an embodiment of the present disclosure, there is provided an alignment method for aligning a container or vehicle inspection system. The inspection system comprises a ray source 1, a collimator 2 and a detector module 3 mounted on a detector arm 4, the ray source 1, the collimator 2 and the detector module 3 being arranged to form an inspection passage, rays emitted from the ray source 1 passing through collimator 2, irradiating onto an inspected object and collected by the detector module 3 so as to complete inspection. The alignment method comprises providing a measuring module 5, the measuring module 5 being arranged to receive rays emitted from the ray source 1 and collimated by the collimator 2. The alignment method further comprises determining a position of a main ray beam based on ray intensity peak values measured by the measuring module 5. It is determined that the main ray beam emitted from the ray source 1 and passing through the collimator 2 has be aligned with the detector module 3 when measurement from the measuring module 5 shows that the ray beam detected at the longitudinal central line of the detector module 3 has the largest intensity (that is, is the main ray beam).

It will be appreciated by those skilled in the art that the ray source mentioned in the present disclosure may be other ray sources than the X-ray and Gamma ray sources. The ray beam described in the present disclosure may be rays in any form for irradiation, for example, may be a pen shaped beam, a fan ray beam or any other desired ray forms.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. An alignment system for a container or vehicle inspection system, comprising a measuring module, which is a sensor row or a sensor array consisted of a plurality of sensors each configured to measure ray intensity;
   one sensor of the measuring module is arranged on a longitudinal central line of a detector module of the container or vehicle inspection system, so that it is determined that rays are aligned with the detector module when a ray intensity value measured by the one sensor of the measuring module arranged on the longitudinal central line of the detector module is a maximum value of a ray intensity value curve.

2. The alignment system according to claim 1, wherein the sensor row or the sensor array and the detector module of the container or vehicle inspection system are arranged to be substantially perpendicular to each other.

3. The alignment system according to claim 1, wherein the sensor is a small-sized detector having a size smaller than a size of a detector crystal of the detector module of the container or vehicle inspection system, and one small-sized detector of the measuring module is arranged on the longitudinal central line of the detector module of the container or vehicle inspection system.

4. The alignment system according to claim 2, wherein the sensor is a small-sized detector having a size smaller than a size of a detector crystal of the detector module of the container or vehicle inspection system, and one small-sized detector of the measuring module is arranged on the longitudinal central line of the detector module of the container or vehicle inspection system.

5. The alignment system according to claim 1, wherein The sensor arranged on the longitudinal central line of the detector module of the container or vehicle inspection system is a sensor located at a middle point of the measuring module.

6. The alignment system according to claim 2, wherein The sensor arranged on the longitudinal central line of the detector module of the container or vehicle inspection system is a sensor located at a middle point of the measuring module.

7. The alignment system according to claim 3, wherein The sensor arranged on the longitudinal central line of the detector module of the container or vehicle inspection system is a sensor located at a middle point of the measuring module.

8. The alignment system according to claim 4, wherein The sensor arranged on the longitudinal central line of the detector module of the container or vehicle inspection system is a sensor located at a middle point of the measuring module.

9. The alignment system according to claim 5, wherein it is determined that rays passing through a collimator have been aligned with the detector module when a ray intensity value measured by the sensor of the measuring module located at the middle point of the detector module is the maximum.

10. An inspection system for a container or a vehicle, comprising a ray source, a collimator, a detector arm and a detector module mounted on the detector arm, the ray source, the collimator and the detector module being arranged to form an inspection passage, rays emitted from the ray source passing through collimator, irradiating onto an object to be inspected and collected by the detector module so as to complete inspection,
   wherein the inspection system further comprises the alignment system according to claim 1.

11. An alignment method for an inspection system for a container or a vehicle, comprising:
   arranging the alignment system according to claim 1 on a longitudinal central line of a detector module located on a detector arm of the container or vehicle inspection system;
   arranging a ray source, a collimator and the detector module of the container or vehicle inspection system to form an inspection passage, the ray source emitting rays, which pass through the collimator and are received by the measuring module of the alignment system and the detector module;
   determining a position of a main ray beam based on ray intensity maximum values fed back from respective sensors of the measuring module;
   calculating a difference between a position on the detector module to which the main ray beam irradiates and the position of the longitudinal central line of the detector module; and
   adjusting the position of the ray source, the collimator or the detector module so that position on the detector module to which the main ray beam irradiates coincides with the position of the longitudinal central line of the detector module.

* * * * *